US005871831A

United States Patent [19]

Zeiter et al.

[11] Patent Number: 5,871,831

[45] Date of Patent: Feb. 16, 1999

[54] LIDDING FOIL WITH CONDUCTIVE STRIPS

[75] Inventors: Patrik Zeiter, Bülach; Markus Lüthi, Winterthur; Keizo Matsuo, Zürich, all of Switzerland

[73] Assignee: Alusuisse Technology & Management Ltd., Switzerland

[21] Appl. No.: 804,290

[22] Filed: Mar. 3, 1997

[30] Foreign Application Priority Data

Mar. 21, 1996 [EP] European Pat. Off. .............. 96810181

[51] Int. Cl.[6] ............................... B32B 1/04; B65D 83/04

[52] U.S. Cl. ........................... 428/76; 428/324; 428/363; 206/531; 206/524.1; 206/524.6; 206/828; 702/176; 702/177

[58] Field of Search .................................... 428/363, 405, 428/406, 35.3, 76, 324, 35.8; 206/531, 828, 532, 524.1, 524.6, 538, 539; 702/176, 177, 187

[56] References Cited

U.S. PATENT DOCUMENTS

| | | | |
|---|---|---|---|
| 4,617,557 | 10/1986 | Gordon | 340/568 |
| 5,091,229 | 2/1992 | Golike et al. | 428/35.2 |
| 5,412,372 | 5/1995 | Parkhurst et al. | 340/568 |
| 5,585,037 | 12/1996 | Linton | 252/518 |

FOREIGN PATENT DOCUMENTS

| | | |
|---|---|---|
| 129785 | 1/1985 | European Pat. Off. . |
| 191168 | 8/1986 | European Pat. Off. . |

*Primary Examiner*—Ellis Robinson
*Assistant Examiner*—Jennifer M. Hayes
*Attorney, Agent, or Firm*—Bachman & LaPointe, P.C.

[57] ABSTRACT

Packaging for medicaments such as blister packs contain a plurality of recesses which hold contents. A lidding foil closes off the packaging and protects the contents. The contents such as tablets are pushed through the lidding foil whereupon the lidding foil breaks. The lidding foil features at least one conductive strip and the medicament packaging can be connected to a computer. On pushing the contents through the lidding foil, the lidding foil breaks and the computer recognizes the impulse emitted as a result of this action. The conductive strips contain, as current carrying fraction, an $SnO_2/SbO_3$ hydroxide mixture on a mica substrate.

15 Claims, 1 Drawing Sheet

LIDDING FOIL WITH CONDUCTIVE STRIPS

BACKGROUND OF THE INVENTION

Lidding foil with conductive strips for medicament packaging which may be connected to a computer, said medicament packaging containing a plurality of recesses holding contents.

Known is e.g. from EP-B 0 129 785 a device for storing and reminding patients to take a required medicament, said device comprising a medicament packaging and a signal transmitter. On removing a dose of medicament, an impulse is emitted via an impulse conductor from the signal transmitter. The impulse conductor is cast into a push-through second foil and the dragees in the medicament packaging are cast into a first foil featuring recesses and the push-through second foil.

This known medicament container represents a form of packaging for medicaments known in the field as a blister pack.

The impulse conductors are housed in the lidding foil of these known medicament container. Medicament containers of this kind i.e. blister packs in general are manufactured in large numbers in a continuous manner. Thereby, as a rule, a plastic film or plastic film laminate is provided with recesses by a deepening process. The contents, such as dragees or also tablets, capsules, ampoules and the like are added to the recesses and finally the lidding foil sealed on to it. Blister packs are as a rule produced continuously from strip-shaped films and only after being filled with their contents and receiving their lid are they cut to the required size and if desired placed in an outer form of packaging.

SUMMARY OF THE INVENTION

The object of the present invention is to propose a lidding foil with improved conductive strips. It should be possible to introduce the conductive strips into the lidding foils in an industrial production process and in a simple manner and, thereafter, insure reliable flow of current.

That objective is achieved by way of the invention in that the conductive strips contain an $SnO_2/SbO_3$ hydroxide mixture on a mica substrate and the lidding foil is made up of at least two layers, one of which is the lidding material attached to the medicament packaging and the second layer is a label containing the conductive strips.

The lidding foil according to the invention may be a support foil, for example a very brittle plastic film such as e.g. a polyolefin film, a polyethylene film or a polyvinylchloride film. The brittleness may be achieved e.g. by adding filler materials such as e.g. talcum, mica etc. Other plastic films may be acryl-nitril-styrene films.

Also e.g. papers or forms of cardboard, clad papers or forms of cardboard or metallised papers or forms of cardboard may find application as support materials.

Further support materials are metal foils coated on one or both sides with further layers such as organic coatings or plastic films and the like.

BRIEF DESCRIPTION OF THE DRAWINGS

The present invention will be more readily understandable from the accompanying drawings, in which.

DETAILED DESCRIPTION OF PREFERRED EMBODIMENTS

Figure 1:
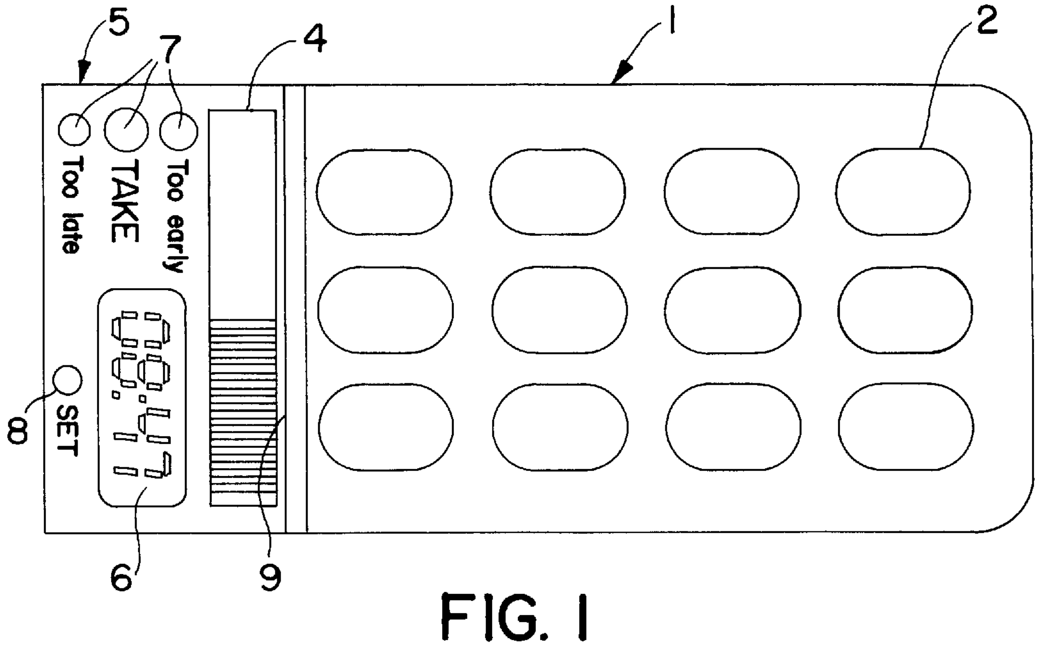
FIG. 1 shows a plan view of a medicament packaging using the present invention.

The above foils, films and papers mentioned as support materials may be employed as materials to protect the conductive strips. These protective materials may be attached to the support material e.g. by adhesive bonding, laminating etc. thereby covering the conductive strips.

If a label is applied to the lidding foil, then, in order to limit the variety of materials involved, it is advantageous to design the label out of the same materials as the lidding foil.

The material for protecting the conductive strips may also be in the form of an organic coating which is applied by spraying, jetting, rolling or brushing, or this may be coatings that are vapor deposited, or vapor deposited or sputtered in vacuum.

The conductive strips within the scope of the present invention are conductive strips containing an $SnO_2/SbO_3$ hydroxide mixture on a mica substrate. The $SnO_2/SbO_3$ hydroxide mixture advantageously exhibits an 8 to 20 nanometer thick layer on the mica particles, advantageously 16 to 20 nm. The $SnO_2/SbO_3$ hydroxide mixture on the mica particles is in the form of a conductive pigment. The ratio Sn:Sb is usefully 95:5 to 75:25, a ratio of 85:15 being preferred. The particle size of the mica may e.g. be 10 to 100 $\mu$m, usefully the size of the mica particles is less than 15 $\mu$m. In order that the desired conductive strips can be produced out of the conductive pigment, it must be brought into the form of an organic coating. A coating may contain the conductive pigment, the $SnO_2/SbO_3$ hydroxide mire on the mica substrate, and a binding agent. Binders in such coatings are e.g. melaminic resins, acrylmelaminic resins, polyurethane coatings, nitrocellulose coatings, acrylnitrocellulose coatings etc. The fraction of binder in the coating may be e.g. from 10 to 60 wt. %, advantageously from 10 to 25 wt. %. Correspondingly, the fraction of conductive pigment in the coating may be 40 to 90 wt. %, advantageously 70 to 90 wt. %. Apart from the conductive pigment a filler material such as $TiO_2$, e.g. of grain size equal to or less than 15 $\mu$m may be used and in a ratio of conductive pigment to filler material of 1:1. Or filler materials in the form of porous spherical particles with a grain size larger than 30 $\mu$m may be used; these are known under the trade name LiChrospher made by the company Merck and may be employed in a ratio of conductive pigment to filler material of 1:1.

The $SnO_2/SbO_3$ hydroxide mixture may e.g. be produced by precipitation by adding a base to an aqueous tin-ammonium salt solution. This way a compact adherent layer is formed in the mica added to the solution. This product in the form of a pigment is not yet electrically conductive. The required electrical properties are acquired by the pigment in a subsequent heat treatment process in which the metal oxide layer loses its chemically bound water and the antimony is transformed to a higher valency oxide. As a result an antimony-doped tin oxide is obtained on mica.

The organic coatings may be applied to the substrate material by brushing, rolling, spraying or jetting, if desired using a mask, this via offset, deep edge plate printing, relief printing or screen printing. Other methods for creating conductive strips on a substrate are depositing the conductive strips on the support using the principle of transfer printing or photochemical reproduction methods or photochemical printing such as e.g. by applying a coating over the whole area, fixing the conductive strip pattern and dissolving away the areas of coating not required.

The conductive strips according to the invention may be transparent or they may be colored. The conductive strips or the coatings for creating the conductive strips may also contain conductive or non-conductive materials such as metal powders, pigments or auxiliary materials such as stabilizers, thickening agents, solvents, suspension agents, emulsifiers etc.

Apart from the desired pattern of conductive strip or strips on the lidding foil or label, it is possible to provide marks for recognition purposes and distance marks or circuits for mechanical attachment of the lidding foil or label on a blister pack. Besides the conductive strips it is also possible to provide circuits which hold information that can be evaluated by the computer e.g. data concerning the contents of the packaging, the composition, dosage of the product, dosage cycle, expiry date etc.

The conductive strips may be arranged in series or parallel and correspondingly, a conductive strip may be laid over all recesses or one conductive strip may be laid over one or more series of recesses, or each recess may be covered by a single conductive strip and each conductive strip has its own connection to the computer. These conductive strips may conduct their information to the computer via a means of connection.

On the basis of the information from an interrupted conductive strip, a time interval program stored in the computer or started up by a circuit on the lidding foil or label may indicate on the display the correct time for taking the next tablet and the times for taking the tablets according to the program. Also the time of taking the tablet may be registered and, based on that, the computer may calculate and display the time for taking the next tablet. The details concerning the time of taking the tablet may be indicated by various commands such as a display with details of time, by colored light emitting diodes, acoustically via a warning signal and the like or via a combination of such control signals.

If each recess is covered by a conductive strip, the computer can determine whether the pack is still unopened or, on the basis of conductor strips that are interrupted because medicament has been taken, may calculate the situation regarding medication of the patient and continue with the suitable interval for further medication.

The conductive strips may be brought together on one side of the lidding foil and arranged such that the computer can be placed there on the medicament package and/or label, and the conductive strips and the computer connections may come into contact.

If a label is employed, then it may contain an adhesive layer by means of which the lidding material is attached.

As a rule the known materials for the base of blister packs may be employed for the base part.

The present lidding foil may also be employed for closing off or covering other items in individual compartments. For example small parts may be packed in blister packs and labels may cover the blister pack. On removing individual small parts, the conductive strip is interrupted and e.g. a safety system to prevent unauthorized could be activated or the impulse may be conducted to a computer for the purpose of stock control or the like.

Figure 2:
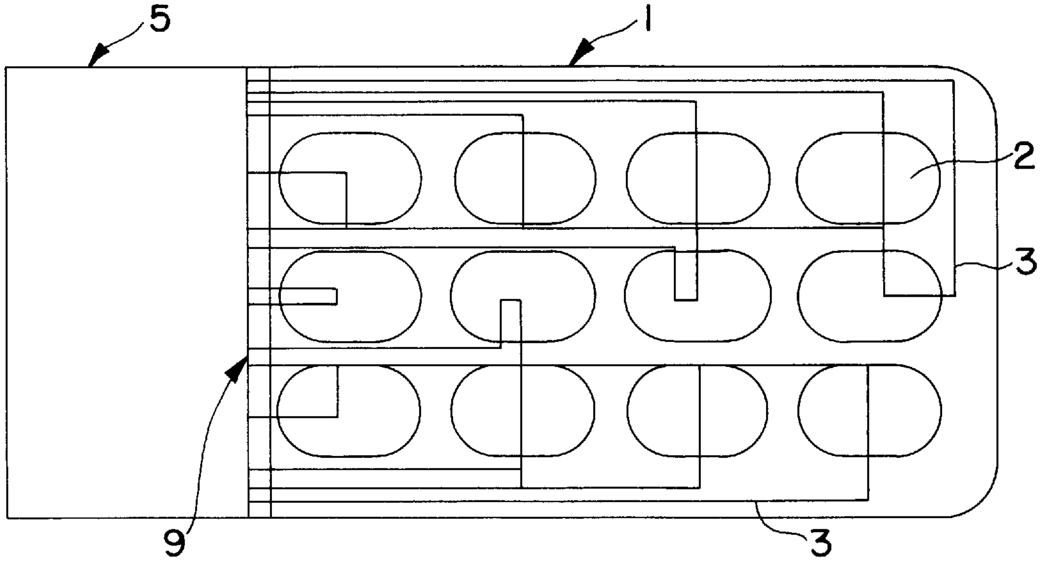
FIG. 2 shows the back side of the packaging of FIG. 1.

The present invention relates also to the use of an $SnO_2/SbO_3$ hydroxide mixture on a mica substrate for conductive strips on the lidding foils of medicament packaging. FIGS. 1 and 2 explain the present invention by way of example in greater detail. FIG. 1 shows a plan view of medicament packaging such as a blister pack 1 with its recesses 2. A computer 5 is connected via a clamping, locking or snap-shut action or other means of connection to the blister pack 1. The clamping connection may be activated e.g. by means of a slide 4 and the conductive strips 3 (see FIG. 2) ending at the edge 9 of the blister pack 1 are brought into contact with counterparts on the computer. The computer 5 features e.g. a time display 6 and/or a display for the time for taking the next dose of medicine and/or a generator for an audible tone. By means of light emitting diodes 7, the process of remembering may be made recognizable for the patient or optically reinforced. The computer may be employed repeatedly and may e.g. be set again to zero by the button 8. FIG. 2 shows the back of the blister pack 1. A pattern of conductive strips 3 is laid over the recesses 2. Each recess is crossed by a conductive strip 3 in order that on removal of the medicament there the conductive strip 3 is interrupted there and an impulse can be sent to the computer 5, or in order that the computer can recognize that the medicament has been taken, is due or overdue. The computer 5 is designed such that the appropriate contact can be made along the edge 9 of the blister pack 1.

We claim:

1. Medicament packaging lidding foil for which comprises lidding foil having conductive strips, wherein said conductive strips contain an $SnO_2/SbO_3$ hydroxide mixture on a mica substrate, wherein said lidding foil is for covering a medicament packaging, said medicament packaging containing a plurality of recesses and including contents in said recesses.

2. Medicament packaging lidding foil according to claim 1, wherein the conductive strips contain an $SnO_2/SbO_3$ hydroxide mixture on a mica substrate and the lidding foil is made up of at least two layers, a first layer which is attached to the medicament packaging and a second layer which is a label containing the conductive strips and said label covers at least the recesses containing the contents.

3. Medicament packaging lidding foil according to claim 1, wherein the mica substrate comprises mica particles, and wherein the conductive strips contain an $SnO_2/SbO_3$ hydroxide mixture on mica particles, and wherein the $SnO_2/SbO_3$ hydroxide mixture exhibits a thickness of 8 to 20 nanometers.

4. Medicament packaging lidding foil according to claim 3, wherein said thickness is 16 to 20 nanometers.

5. Medicament packaging lidding foil according to claim 1, wherein the mixture has a ratio of Sn:Sb from 95:5 to 75:25.

6. Medicament packaging lidding foil according to claim 5, wherein the ratio of Sn:Sb is 85:15.

7. Medicament packaging lidding foil according to claim 3, wherein the mica particles have a grain size of from 10 to 100 $\mu$m.

8. Medicament packaging lidding foil according to claim 7, wherein the mica particles have a grain size of less than 15 $\mu$m.

9. Medicament packaging lidding foil according to claim 1, wherein a conductive pigment is deposited on the mica substrate as a constituent of an organic coating.

10. Medicament packaging lidding foil according to claim 1, wherein said medicament packaging is connected to a computer via said conductive strips.

11. Medicament packaging, which comprises: a medicament packaging containing a plurality of recesses and including contents in said recesses; and lidding foil covering said recesses said lidding foil having conductive strips which contain an $SnO_2/SbO_3$ hydroxide mixture on a mica substrate.

12. Medicament packaging according to claim 11, wherein said packaging is connected to a computer via said conductive strips.

13. Medicament packaging according to claim 11, wherein the mica substrate comprises mica particles, and wherein the conductive strips contain an $SnO_2/SbO_3$ hydroxide mixture on mica particles, and wherein the $SnO_2/SbO_3$ hydroxide mixture exhibits a thickness of 8 to 20 nanometers.

14. Medicament packaging according to claim 11, wherein the conductive strips contain an $SnO_2/SbO_3$ hydroxide mixture on a mica substrate and the lidding foil is made up of at least two layers, a first layer which is attached to the medicament packaging and a second layer which is a label containing the conductive strips and said label covers at least the recesses containing the contents.

15. Medicament packaging according to claim 14, wherein said medicament packaging is connected to a computer via said conductive strips.

* * * * *

UNITED STATES PATENT AND TRADEMARK OFFICE

CERTIFICATE OF CORRECTION

PATENT NO. : 5,871,831

DATED : February 16, 1999

INVENTOR(S) : PATRIK ZEITER ET AL.

It is certified that error appears in the above-identified patent and that said Letters Patent is hereby corrected as shown below:

In Column 4, claim 1, line 15, after "packaging lidding foil" the word "for" should be deleted.

Signed and Sealed this

First Day of June, 1999

Attest:

Q. TODD DICKINSON

*Attesting Officer*

*Acting Commissioner of Patents and Trademarks*